PYROTECHNIC COMPOUND TRIS(GLYCINE) STRONTIUM (II) PERCHLORATE AND METHOD FOR MAKING SAME

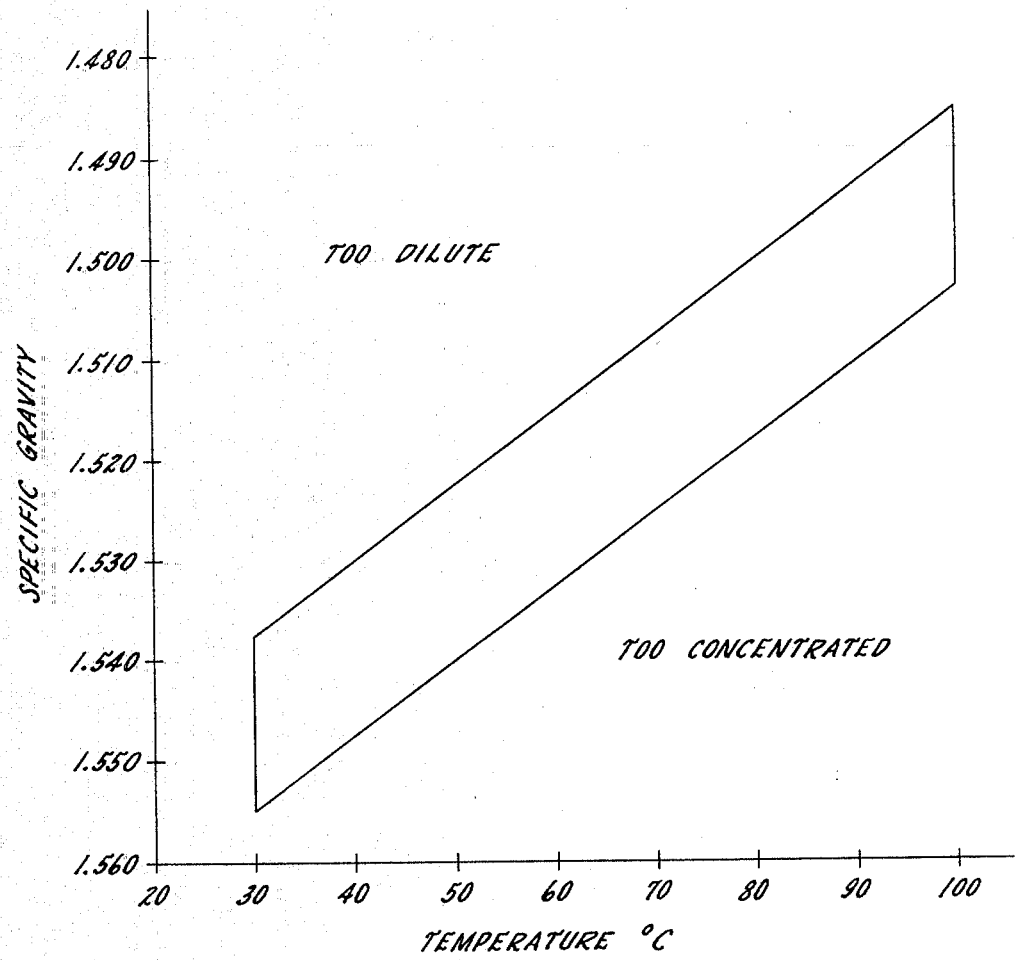

Bernard E. Douda, Bloomfield, Ind., assignor to the United States of America as represented by the Secretary of the Navy
Filed Nov. 9, 1964, Ser. No. 410,037
5 Claims. (Cl. 149—75)

The invention described herein may be manufactured and used by or for the Government of the United States of America for governmental purposes without the payment of any royalties thereon or therefor.

The present invention relates to a new compound and more particularly to a new compound that can be used as a pyrotechnic composition, either singularly or in combination with other ingredients.

Red pyrotechnic flares are presently formulated using conventional ingredients such as strontium nitrate, potassium perchlorate, magnesium, polyvinyl chloride and strontium oxalate. These and similar ingredients are mixed together in various proportions to make red flares. There is, however, a continuing demand, especially from military services, to provide flares with increased performance, and to meet these requirements, conventional ingredients are rearranged and reapportioned. The state of the art has now reached the point where rearranging and reapportioning will no longer provide new flares.

The present invention relates to a new compound that contains its own fuel, oxygen, and color ingredients. This compound is prepared by the reaction of glycine with strontium perchlorate in a ratio of 3 moles of glycine to one mole of strontium perchlorate. The synthesis methods consist essentially in the evaporation of water from an aqueous solution of the two ingredients. The resultant compound is a white crystalline solid; not considered as being hygroscopic; not sensitive when subjected to impact and electrostatic sensitivity tests; and, when burned, produces a red flame.

It is therefore a general object of the present invention to provide a new compound by reacting glycine and strontium perchlorate in the ratio of three moles to one mole.

Another object of the present invention is to provide a new compound suitable for use as a pyrotechnic material.

Other objects and advantages of the present invention will be readily appreciated as the same becomes better understood by reference to the following detailed description when considered in connection with the accompanying drawing wherein the figure is a graph showing the optimum relationship between temperature and specific gravity in the formation of crystals.

In the synthesis of the new compound of the present invention, one mole of strontium perchlorate is dissolved in 300 ml. of distilled water and then heated to about 80 degrees C. Any insolubles are then filtered out. Next, three moles of glycine are added to the solution and the solution is stirred until the glycine is dissolved. The solution is then adjusted for optimum crystallization condition. It has been found that crystals will most readily form when the specific gravity of the solution is maintained within a certain range for a given temperature. The figure of the drawing shows the range of specific gravity for various temperatures. For example, when the solution is maintained at a temperature of 80 degrees C., the specific gravity of the solution should be maintained between 1.500 and 1.517.

At a temperature of about 65 degrees C. the solution is seeded and crystals begin to form. During formation of the crystals, the solution is allowed to cool without stirring and by the time the temperature of the solution reaches 25 degrees C., crystals have been formed in large quantities. The crystals are removed by filtration and then dried at about 100 degrees C. The filtrate can be used to form additional crystals by adding more strontium perchlorate and glycine in the proper proportion.

The compound formed by the reaction of strontium perchlorate and glycine is a white crystalline solid and has a solubility of 120 gms. per 100 ml. of water at 25 degrees C. It is estimated that the molecular weight is 511.75. A 3 gm. sample of the new compound gained 0.635 percent in weight after it has been subjected for 6 hours to a slowly moving stream of air containing 75 percent humidity at 25 degrees C. The compound is, therefore, not considered as being hygroscopic. The compound was considered as being not sensitive when subjected to impact and electrostatic sensitivity tests.

Pyrotechnic candles were prepared by pressing various compositions into cardboard tubes having an inside diameter of 1.437 inches. The length of the candle was about 2.5 inches.

Example I

A candle was pressed using a mixture of 100 grams of compound (tris (glycine) strontium (II) perchlorate) and 3 grams of castor oil. The candle burned with a weak red flame for about three minutes. Very little ash was formed.

Example II

A candle was pressed using a mixture of 95 grams of compound (tris (glycine) strontium (II) perchlorate), 5 grams of magnesium, and 3 grams of castor oil. The candle burned with a weak red flame for two minutes. There was a slight trace of ash formation.

Example III

A candle was pressed using a mixture of 90 grams of compound (tris (glycine) strontium (II) perchlorate), 10 grams of magnesium, and 3 grams of castor oil. The candle burned with a strong red flame for about 1.75 minutes and the ash formation was low.

Example IV

A candle was pressed using 80 grams of compound (tris (glycine) strontium (II) perchlorate), 20 grams of magnesium, and 3 grams of castor oil. The candle burned with a strong red flame about 1.33 minutes and there was medium ash formation.

The above-listed formulas are not necessarily the optimum ones for pyrotechnic candles, but rather were compounded to provide that the compound tris (glycine) strontium (II) perchlorate would support combustion without the addition of a supplementary oxygen supply, and also, to show that the compound could be mixed with other pyrotechnic ingredients to make a flare. As synthesized, the compound contains its own oxygen, fuel and coloring agent in proportions such that it will sustain combustion while producing a red flame.

As an alternate method of preparation, the compound tris (glycine) strontium (II) perchlorate can be prepared by first dissolving 1 molecular weight of strontium perchlorate in 300 ml. of distilled water. The solution is stirred while heating to 80 degrees C. Next 3 molecular weights of glycine are dissolved in the solution and then the water is evaporated by heating. The white solid that remains is dried and is the compound tris (glycine) strontium (II) perchlorate.

It can thus be seen that the present invention provides a new compound which contains its own fuel, oxygen supply and coloring agent and thus is suitable for use as a pyrotechnic substance. Obviously many modifications and variations of the present invention are possible in the light of the above teachings. It is therefore to be understood, that within the scope of the appended claims, the invention may be practiced otherwise than as specifically described.

What is claimed is:

1. A process for preparing a pyrotechnic compound comprising:
   first dissolving one mole of strontium perchlorate in water to form a solution,
   next dissolving three moles of glycine in said solution, and
   then removing said water.

2. A process for preparing a pyrotechnic compound comprising:
   first dissolving one mole of strontium perchlorate in water to form a solution,
   next dissolving three moles of glycine in said solution,
   next seeding said solution containing the dissolved glycine to cause the formation of crystals, and
   then removing said crystals by filtration.

3. A process for preparing a pyrotechnic compound comprising:
   first dissolving one mole of strontium perchlorate in water to form a solution,
   next dissolving three moles of glycine in said solution, and
   then removing water by heating said solution containing the dissolved glycine.

4. A consumable pyrotechnic compound prepared by dissolving one mole of strontium perchlorate and three moles of glycine in water and then removing the water.

5. Tris (glycine) strontium (II) perchlorate.

References Cited by the Applicant
UNITED STATES PATENTS
2,987,558   6/1961   Blitzer et al.

CARL D. QUARFORTH, *Primary Examiner.*

S. J. LECHERT, JR., *Assistant Examiner.*